(12) United States Patent
Wang et al.

(10) Patent No.: US 9,654,624 B2
(45) Date of Patent: May 16, 2017

(54) METHOD, DEVICE AND MOBILE TERMINAL FOR AUTOMATIC RECORDING

(71) Applicant: Xiaomi Inc., Beijing (CN)

(72) Inventors: Na Wang, Beijing (CN); Ling Zhu, Beijing (CN); Tianyang Zhou, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 8 days.

(21) Appl. No.: 14/138,146

(22) Filed: Dec. 23, 2013

(65) Prior Publication Data

US 2014/0302823 A1 Oct. 9, 2014

Related U.S. Application Data

(63) Continuation-in-part of application No. PCT/CN2013/085922, filed on Oct. 25, 2013.

(30) Foreign Application Priority Data

Apr. 8, 2013 (CN) .......................... 2013 1 0118944

(51) Int. Cl.
*H04M 3/42* (2006.01)

(52) U.S. Cl.
CPC .... *H04M 3/42221* (2013.01); *H04M 2201/36* (2013.01)

(58) Field of Classification Search
CPC H04M 3/42221; H04M 2201/36; H04W 4/16
USPC ....................................................... 455/414.1
See application file for complete search history.

(56) References Cited

U.S. PATENT DOCUMENTS

| | | | |
|---|---|---|---|
| 6,804,638 B2 | 10/2004 | Fiedler | |
| 2003/0040917 A1* | 2/2003 | Fiedler | 704/500 |
| 2004/0097219 A1* | 5/2004 | Lee | 455/418 |
| 2006/0287000 A1* | 12/2006 | Sun | H04M 1/656 |
| | | | 455/550.1 |
| 2007/0121860 A1* | 5/2007 | Liang et al. | 379/158 |
| 2008/0205605 A1* | 8/2008 | Gao et al. | 379/88.22 |
| 2009/0037894 A1* | 2/2009 | Unger | 717/162 |

(Continued)

FOREIGN PATENT DOCUMENTS

| | | |
|---|---|---|
| CN | 1272742 A | 11/2000 |
| CN | 1825865 A | 8/2006 |
| CN | 1825965 A | 8/2006 |

(Continued)

OTHER PUBLICATIONS

"International Search Report for PCT/CN2013/085922".

*Primary Examiner* — Dinh P Nguyen
(74) *Attorney, Agent, or Firm* — Jun He Law Offices P.C.; James J. Zhu

(57) ABSTRACT

The present disclosure discloses a method, a device, and a mobile terminal for performing automatic recording. The method comprises: obtaining content of an ongoing call; performing a recording operation on the content of the ongoing call, and saving a recording of the content of the ongoing call in a predefined region of a system ring buffer. The technical solutions provided in the present disclosure solve the problems of troublesome manual recording adjustments and excessive waste of system resources arising from recording valueless call content, thereby improving user experience.

11 Claims, 3 Drawing Sheets

(56) References Cited

U.S. PATENT DOCUMENTS

2011/0282664 A1* 11/2011 Tanioka ................ G06F 3/0486
  704/235
2011/0300833 A1* 12/2011 Shaw ........................... 455/413

FOREIGN PATENT DOCUMENTS

| | | | |
|---|---|---|---|
| CN | 1871841 | A | 11/2006 |
| CN | 101478717 | A | 7/2009 |
| CN | 102231771 | A | 11/2011 |
| CN | 102364925 | A | 2/2012 |
| CN | 103220392 | A | 7/2013 |
| JP | 07-107154 | A | 4/1995 |

* cited by examiner

METHOD, DEVICE AND MOBILE TERMINAL FOR AUTOMATIC RECORDING

CROSS-REFERENCE TO RELATED APPLICATION

This application is a Continuation-In-Part of International Application PCT/CN2013/085922, with an international filing date of Oct. 25, 2013, which claims the priority to Chinese Patent Application No. 201310118944.4, filed on Apr. 8, 2013 and entitled "Method and device for automatic recording", the entire contents of all of which are incorporated herein by reference.

TECHNICAL FIELD

The disclosure relates to mobile communication, and more particularly, to a method, a device, and a mobile terminal for performing automatic recording.

BACKGROUND

With the increasing popularity of mobile phones, people often need to save the content of their phone calls. In order to satisfy such demand, some existing mobile phones are provided with call recording function for saving the call content of phone users in audio format. However, for mobile phones with such recording function, it is often required to activate the function during the call, which may be very inconvenient for the users. Currently, the recorded content is generally stored in an external storage device such as a SD card, which significantly occupies the system resource of the mobile phones.

Moreover, if a user forgets to activate the recording function during the call, the call content may not be saved, thus some important call content may be lost.

SUMMARY

According to the embodiments of the present disclosure, there are provided a method, a device and a mobile terminal for performing automatic recording, which can enable real-time recording, and avoid consuming excessive system resource, thereby improving the user experience.

According to a first aspect of the present disclosure, there is provided a method for, performing automatic recording, wherein the method comprises: obtaining content of an ongoing call; performing a recording operation on the obtained content of the ongoing call; and saving a recording of the content of the ongoing call in a predefined region of a system ring buffer.

In another aspect, the present disclosure further provides a device for performing automatic recording, wherein the device comprises: an obtaining unit configured to obtain content of an ongoing call; and a recording unit configured to perform a recording operation on the obtained content of the ongoing call and save a recording of the content of the ongoing call in a predefined region of a system ring buffer.

In another aspect, the present disclosure further provides a mobile terminal comprising: a processor; a system memory coupled to the processor; wherein the processor is configured to execute the steps comprising: obtaining content of an ongoing call; and performing a recording operation on the obtained content of the ongoing call and saving a recording of the content of the ongoing call in a predefined region of a system ring buffer of the system memory.

In another aspect, the present disclosure further provides a non-transitory storage medium including instructions, executable by a processor in a mobile terminal, for performing a method comprising: obtaining content of an ongoing call; and performing a recording operation on the obtained content of the ongoing call, and saving a recording of the content of the ongoing call in a predefined region of a system ring buffer.

Accordingly, the recording method provided herein enables any incoming calls or specially designated calls thereof can be automatically recorded by default, and the recording of the incoming call content may be saved in the ring buffer of a system memory. A predefined region is allocated in the system memory specifically for saving the records. The predefined region may generally be defined according to the size of the system memory, for example, the predefined region may be of 32M-bit or may be larger or smaller in size. Thus, if very important content is contained in the record saved in the system memory, then such record may be transferred to an external storage. Otherwise, if there is no important content, the saved data in the predefined region may be overwritten by a recording of a new call when the predefined region is full. The method provided in the present disclosure ideally solves the problem of the need of manual selection for activating the recording in existing recording methods, and the increase of system resource usages because of storing the records in SD cards, thereby improving the user experience.

DESCRIPTION OF THE EMBODIMENTS

A method, a device, a mobile terminal and a non-transitory storage medium for performing automatic recording provided according to the embodiments of the present disclosure will be described in detail hereinafter with reference to the accompanying drawings.

It should be noted that, in the embodiments of the present disclosure, the mobile terminal is illustrated as a mobile phone. However, the mobile terminal according to the embodiments of the present disclosure is not limited to the mobile phone, which may also include any apparatus having a display screen, such as a tablet PC or a smart player.

Figure 1:
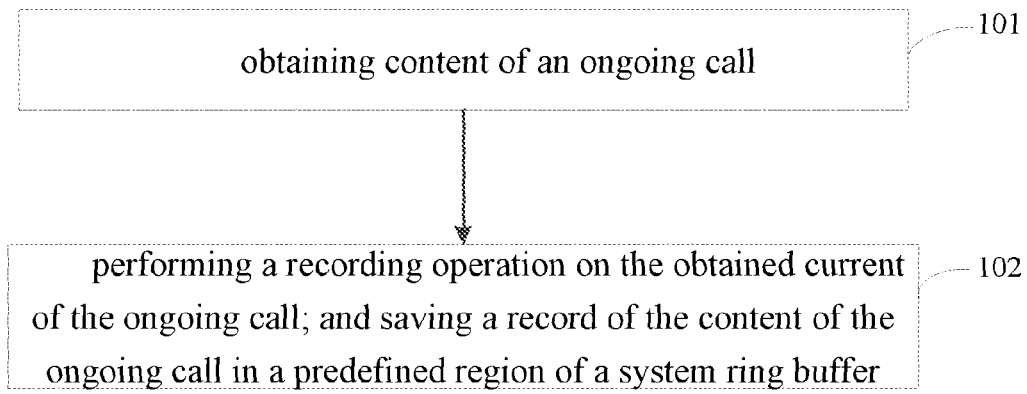
FIG. 1 is an exemplary flow chart of a method for performing automatic recording according to a first embodiment of the present disclosure.

FIG. 1 is an exemplary flow chart of a method for performing automatic recording according to an embodiment of the present disclosure. The method is for use in a device, such as a mobile terminal, and the method includes the following steps: Step 101 obtaining content of an ongoing call; Step 102 performing a recording operation on the obtained content of the ongoing call; and Step 103 saving a recording of the content of the ongoing call in a predefined region of a system ring buffer.

For the existing mobile terminals, the recording function is generally manually activated when needed, which may be inconvenient for a user, especially when the call is ongoing. Another situation would be the automatic recording function is always activated in the mobile terminals, which may produce a large amount of unnecessary recorded data that increases the burden of the system storage and consumes additional system resource. According to the embodiment of the present disclosure, the mobile terminal has a predefined region for storing the records of the call content, which is allocated in the ring buffer of a system memory. In the embodiment of the present disclosure, every call is recorded by default. That is, the recording operation needs not to be manually activated. Furthermore, the predefined region may be defined according to the size of the system memory, which may have a size generally of 32M-bit or 64M-bit. Accordingly, the capacity of the system memory for saving the recorded data corresponds to half an hour or an hour call respectively. Alternatively, the predefined region may be defined to have a smaller size such as 16M-bit, which means that the recorded data of the call content may need to be updated frequently.

Figure 2:
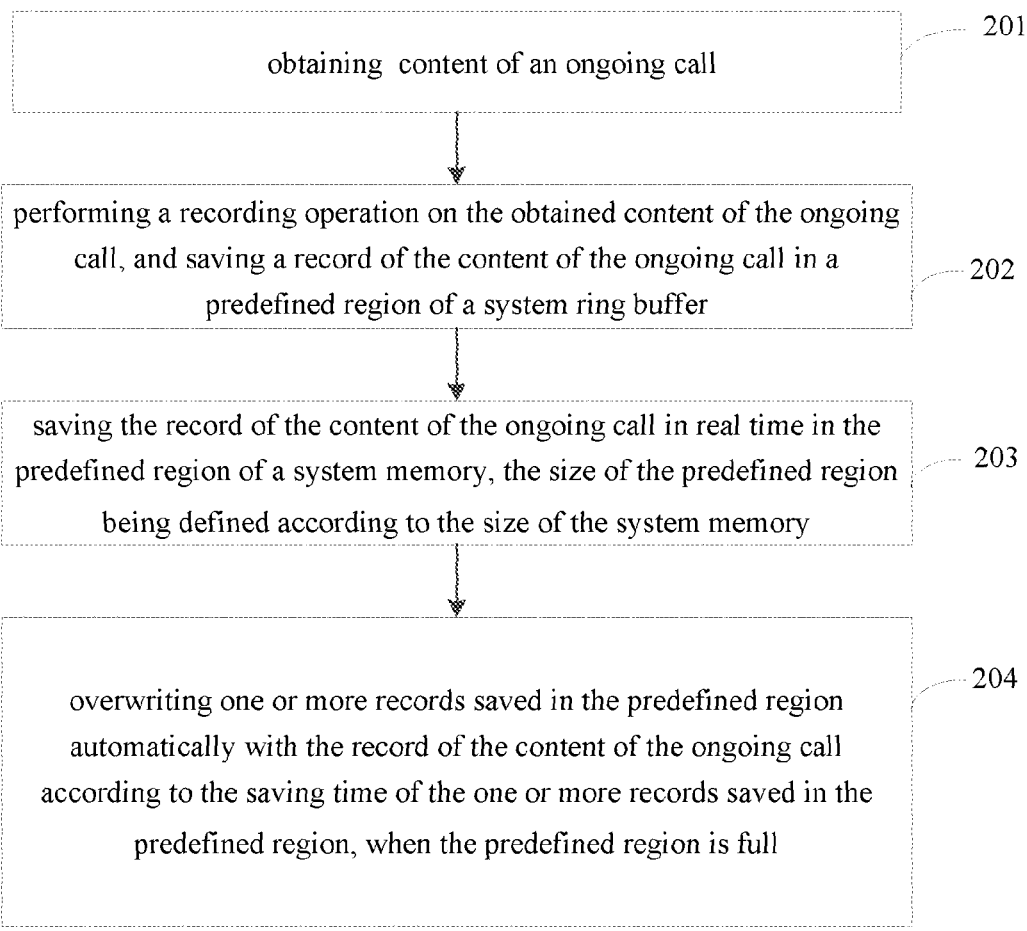
FIG. 2 is an exemplary flow chart of a method for performing automatic recording according to a second embodiment of the present disclosure.

FIG. 2 is an exemplary flow chart of a method for performing automatic recording according to a second embodiment of the present disclosure. The method is for use in a device, such as a mobile terminal, and the method includes the following steps: Step 201 obtaining the content of an ongoing call, Step 202 performing a recording operation on the obtained content of the ongoing call and saving a recording of the content of the ongoing call in a predefined region of a system ring buffer, Step 203 saving the recording of the content of the ongoing call in real time in the predefined region of a system memory, and Step 204 overwriting one or more records saved in the predefined region automatically with the recording of the content of the ongoing call according to the chronological order of the saving time of the one or more records, when the predefined region is full. Herein, the size of the predefined region being defined according to the size of the system memory.

For the phone calls of those important friends or clients, if it is necessary to save all the calls thereof, records of those calls may be directly transferred by default.

In an embodiment, a phone number of an opposite party of the ongoing call is determined first. When the phone number of the ongoing call is determined as a preset phone number for which the automatic recording operation is set to performed automatically, the automatic recording operation is performed. The preset phone number can be set by the user in advance, for example, by associating an indicator with the phone number stored in the contact list. When the phone number is determined as the preset phone number, all the records of the content of the calls with the phone number are first saved in the system memory by default, and then transferred to the predefined region.

In this embodiment of the present disclosure, all the calls are recorded and saved by default, and the saved records are stored in the predefined region. Therefore, where the size of the predefined region is fixed, those useless records saved therein may need to be overwritten. In this way, it is required to determine whether any important record content is contained in the saved recording of content of the ongoing call.

When it is determined the recording of the content of the ongoing call has the important record content, the recording of the content of the ongoing may be further transferred to an external storage, such as a SD card attached to the mobile terminal.

If those important records are consistently selected to be transferred to the external storage, the record content saved in the predefined region may be overwritten with a new record when the space of the predefined region is determined to be fully occupied. The overwriting may be performed in the chronological order of the saving time of the records. Thus, the most recent important call content can be saved, and the waste of system resource can be avoided.

In the present embodiment, determining whether any important record content is contained in the record of content of the ongoing call includes the following steps: obtaining a record tracing instruction; determining whether the recording of the content of the ongoing call contains the important record content according to the obtained record tracing instruction; and transferring the recording of the content of the ongoing call containing the important record content to the external storage.

In this embodiment of the present disclosure, when a user finds out that there is important content needed to be saved during the ongoing call, the transfer of record may be performed immediately or later. In other words, a trigger instruction (i.e., the record tracing instruction) may be generated via a call setting interface, which is provided for the user to transfer the important call record any time during the ongoing call, or transfer the important call record corresponding to the calling number of the opposite party to the external storage after the ongoing call.

Figure 3:
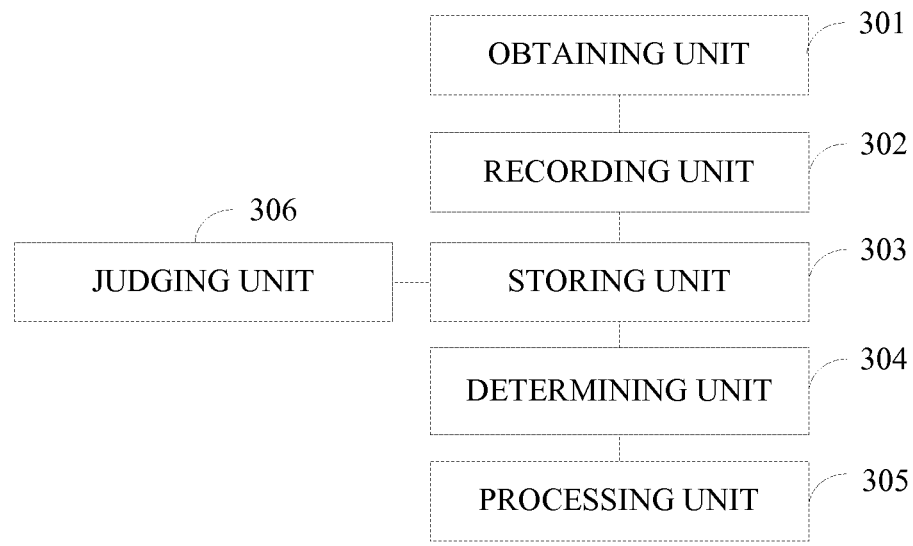
FIG. 3 is an exemplary block diagram of a device for performing automatic recording according to the first embodiment of the present disclosure.

FIG. 3 is an exemplary block diagram of a device for performing automatic recording provided in the first embodiment of the present disclosure. The device includes: an obtaining unit 301 configured to obtain the content of an ongoing call; a recording unit 302 configured to perform a recording operation for the obtained content of the ongoing call and save a recording of the content of the ongoing call in a predefined region of a system ring buffer.

In this embodiment, the obtaining unit 301 may obtain the call content, which generally contains the voice data of the conversation between two parties of the call, and generally also contains the phone number of the opposite party of the call and the time information (such as the duration, and/or the beginning and ending time of the call) of the call. The recording unit 302 may record in real time the call content obtained by the obtaining unit 301, record the time information and the phone number of the opposite party for each call content, and save the recording of the call content in the predefined region of the system ring buffer. In general, the system memories for various system memories may vary in size, thus the size of the predefined region may be specifically defined according to different system memories. For example, the size of the predefined region may be defined relatively bigger for a 4G-bit system memory, while the size of the predefined region may be defined relatively smaller for a 2G-bit system memory. Where those records of the call content are saved without significantly occupying the system resource, the records can be saved considerably fast, much faster than the speed at which the existing mobile terminals save the records in an external storage such as a SD card after the recording. Moreover, the recording and saving operations can produce little data input/output (I/O) operations for the system (at the I/O interface between the system memory and the external storage), thus reducing waste of system resource without affecting the quality of the records.

Figure 4:
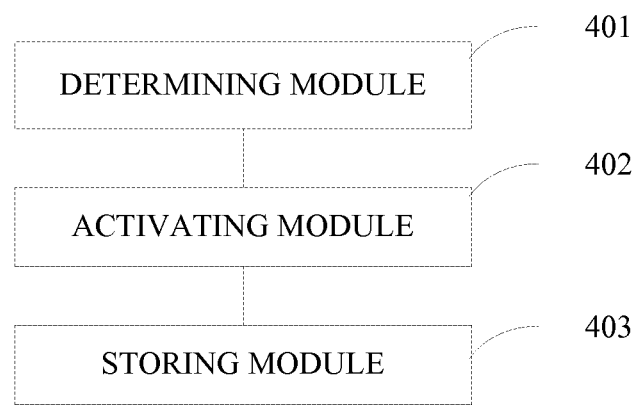
FIG. 4 is a block diagram of a device for performing automatic recording according to another embodiment of the present disclosure.

FIG. 4 is a block diagram of a device for performing automatic recording provided in another embodiment of the present disclosure.

The recording unit includes a determining module 401 configured to determine a phone number of the opposite party of the ongoing call.

The recording unit further includes: an automatic recording module 402 configured to perform an automatic recording operation when the phone number of the opposite party of the ongoing call is determined as a preset phone number for which the automatic recording operation is set to performed automatically; and a storing module 403 configured to save the content of the ongoing call in the predefined region.

In the present embodiment, as mentioned above, the obtaining unit may need to obtain the call content as well as the related information such as the phone number and the time information of the call. The determining module 401 determines whether the phone number belongs to the preset phone numbers by checking the phone number of the ongoing call. If the determining module 401 determines that the phone number is one of the preset phone numbers for which the automatic recording are needed, then the phone number of the ongoing call is an important phone number. Therefore, in order to avoid missing the call content for such important phone numbers, the content of the calls with such phone numbers may be recorded by default. In addition, the storing module 403 may transfer all the records of the call content corresponding to such phone numbers to an external storage. The record content may be transferred in two ways, one way is to transfer the record content in real time, and another way is to transfer the record content with delay. In this way, it is required to determine whether the predefined region is filled with the call content of the ongoing call. If it is not full, the transferring may be performed after the ongoing call; and if it is determined that the predefined region is nearly completely filled with the record of the content of the ongoing call, the record may be transferred to the external storage in chronological order of the saving time when a threshold for such record reaches.

In the embodiment described above, the device may further include: a storing unit 303 configured to save the recording of the content of the ongoing call in real time in the predefined region of the system memory; the size of the predefined region being defined according to the size of the system memory; a determining unit 304 configured to determine the status of the predefined region; a processing unit 305 configured to automatically overwrite the records saved in the predefined region with the recording of the content of the ongoing call when the predefined region is full, wherein the automatically overwriting is performed in chronological order of the saving time of those records; and a judging unit 306 configured to determine whether the recording of the content of the ongoing call has important record content.

The storing unit records the content of the ongoing call and saves the record in the predefined region of the system ring buffer, wherein the size of the predefined region may be set according to some factors including the size of the system memory and/or the user's requirement for the call content of the incoming call. The size of the predefined region may be different for different mobile terminals or users. The determining unit determines the free space of the predefined region in real time, and the recording may continue if the predefined region is determined as being not filled with the record content of calls. The space occupied by those previously recorded content may be overwritten with a new record if the predefined region is determined as being filled up with record content. The overwriting may be performed in chronological order of the saving time, in particular, the earliest record content may be overwritten first. When the judging unit determines that the important record content is contained in the recording of the content of the ongoing call, the recording of the content of the ongoing call having the important record content may be transferred to the external storage.

The recording unit 302 is also configured to transfer the recording of the content of the ongoing call having the important record content to the external storage when the judging unit determines that the important record content is contained in the recording of the content of the ongoing call.

Figure 5:
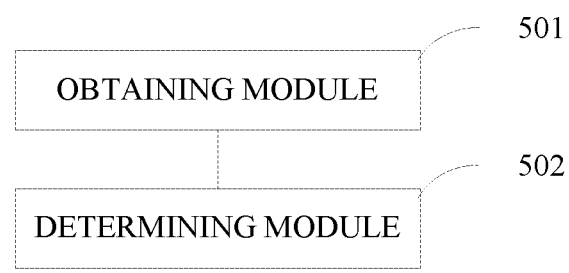
FIG. 5 is a block diagram of a determining unit in the first embodiment of the present disclosure.

FIG. 5 is a schematic block diagram of the judging unit in the first embodiment of the present disclosure. The judging unit includes an obtaining module 501 and a determining module 502.

The obtaining module 501 is configured to obtain a record tracing instruction.

The determining module 502 is configured to determine that the record of the content of the ongoing call is the important record content according to the obtained record tracing instruction.

The storing module 403 is configured to transfer the recording of the content of the ongoing call having the important record content to an external storage.

A physical or virtual button or contact point for reviewing records of calls may be provided on an interface for answering calls. The button or contact point may be directly clicked or touched by a user when the user finds out that the recording of the call content has important record content. As a result, the important record content can be transferred to the external storage. Thus, the important record content may be obtained timely. Otherwise, the record tracing instruction may be inputted via an interface of call history after the call, and the recorded important call content can be transferred accordingly so as to transfer the call content corresponding to a specific phone number or a specific contact from the predefined region to the external storage.

The determining unit 304 provided in the embodiment of the present disclosure is configured to automatically overwrite the record content saved in the predefined region with the recording of the content of the ongoing call when determining that the predefined region is fully stored. In certain embodiments, the record content saved in the predefined region may be overwritten with the recording of the content of the ongoing call in chronological order of the saving time of those records.

The methods for performing automatic recording according to embodiments of the present disclosure may be implemented by the mobile terminal. In practical applications, the mobile terminal may include mobile phones, digital broadcast terminals, messaging devices, gaming consoles, tablets, medical devices, personal digital assistants, and the like.

The mobile terminal includes one or more processors, such as a computer processor or microprocessor as known in the industry to receive various data, programs and instructions, and to process such data, programs and instructions accordingly. The mobile terminal may also include a memory which is coupled to the one or more processors and is configured to store the data, programs and instructions to be processed by the processors.

Furthermore, the mobile terminal may further include input modules, such as a touch screen, a keyboard, a mouse or the like to receive requests and inputs from the user. These are not described in details as they would be readily apparent to those skilled in the art.

Those skilled in the art may appreciate that all or a part of steps in the above embodiments may be implemented by a hardware or may be implemented in a related hardware instructed by instructions stored in a non-transitory computer readable storage medium. The computer can also include the mobile terminal as defined in the present disclosure.

The non-transitory computer readable storage medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory of the mobile terminal.

The aforementioned methods can be implemented in a non-transitory computer readable storage medium recording computer-readable codes. The non-transitory computer readable storage medium includes all kinds of recording devices in which data readable by a computer system are stored. The non-transitory computer readable storage medium includes ROM, RAM, CD-ROM, magnetic tapes, floppy discs, optical data storage devices, and the like, as well as carrier-wave type implementations (e.g., transmission via Internet).

It should be understood by those skilled in the art that the accompanying drawings are only schematic diagrams of some exemplary embodiments and the modules or flows therein are not always necessary for implementing the present disclosure.

It should be understood by those skilled in the art that those modules in the device of the embodiments may be distributed in the device as described in the embodiments, or may be varied so as to be located in one or more devices which are different from that in the present embodiment. Those modules of the above embodiments may be integrated into one module, or may be further divided into a plurality of sub-modules.

Serial numbers of the embodiments of the present disclosure hereinabove are only for purpose of illustration, not for representing any superiority or inferiority of the embodiments.

It is obvious for those skilled in the art that various changes and modifications may be made to the present disclosure without departing from the objective and scope of the present disclosure. Thus, the present disclosure intends to cover such changes and modifications if those changes and modifications fall within the scope of claims and equivalents thereof in the present disclosure.

What is claimed is:

1. A method for performing automatic recording in a mobile terminal, comprising:
obtaining conversation content of an ongoing call;
automatically performing a recording operation on the obtained conversation content of the ongoing call without manually activating the recording operation by a user of the mobile terminal;
saving a recording of the conversation content of the ongoing call in real time in a predefined region within the mobile terminal's internal ring buffer storage;
determining whether the saved recording of the conversation content includes important content according to a record tracing instruction provided by the user;
determining whether the predefined region reaches a threshold;
transferring the saved recording of the conversation content to an external storage independent of the mobile terminal in chronological order of the saving time in response to the record tracing instruction indicating that the recording of the conversation content includes the important content and in response to determining that the predefined region reaches the threshold;
determining whether the predefined region is full;
overwriting one or more records saved in the predefined region automatically with the recording of the conversation content of the ongoing call according to the chronological order of the saving time of the one or more records saved in the predefined region, when the predefined region is full.

2. The method according to claim 1, wherein obtaining the conversation content of the ongoing call comprises:
determining a phone number of an opposite party of the ongoing call.

3. The method according to claim 2, wherein the saved recording of the conversation content is automatically transferred to the external storage in response to the phone number of the opposite party of the ongoing call being determined as a preset phone number for which the transferring is set to be performed automatically.

4. A mobile terminal, comprising:
a processor; and
a system memory coupled to the processor;
wherein the processor is configured to execute the steps comprising:
obtaining conversation content of an ongoing call;
automatically performing a recording operation on the obtained conversation content of the ongoing call without manually activating the recording operation by a user of the mobile terminal;
saving a recording of the conversation content of the ongoing call in real time in a predefined region within the mobile terminal's internal ring buffer storage;
determining whether the saved recording of the conversation content includes important content according to a record tracing instruction provided by the user;
determining whether the predefined region reaches a threshold;
transferring the saved recording of the conversation content to an external storage independent of the mobile terminal in chronological order of the saving time in response to the record tracing instruction indicating that the recording of the conversation content includes the important content and in response to determining that the predefined region reaches the threshold;
determining whether the predefined region is full;
overwriting one or more records saved in the predefined region automatically with the recording of the conversation content of the ongoing call according to the chronological order of the saving time of the one or more records saved in the predefined region, when the predefined region is full.

5. The mobile terminal according to claim 4, wherein when obtaining the conversation content of the ongoing call, the processor is further configured to:
   determine a phone number of an opposite party of the ongoing call.

6. The mobile terminal according to claim 5, wherein the saved recording of the conversation content is automatically transferred to the external storage in response to the phone number of the opposite party of the ongoing call being determined as a preset phone number for which the transferring is set to be performed automatically.

7. A non-transitory storage medium including instructions, executable by a processor in a mobile terminal, for performing a method comprising:
   obtaining conversation content of an ongoing call;
   automatically performing a recording operation on the obtained conversation content of the ongoing call without manually activating the recording operation by a user of the mobile terminal;
   saving a recording of the conversation content of the ongoing call in real time in a predefined region within the mobile terminal's internal ring buffer storage;
   determining whether the saved recording of the conversation content includes important content according to a record tracing instruction provided by the user;
   determining whether the predefined region reaches a threshold;
   transferring the saved recording of the conversation content to an external storage independent of the mobile terminal in chronological order of the saving time in response to the record tracing instruction indicating that the recording of the conversation content includes the important content and in response to determining that the predefined region reaches the threshold;
   determining whether the predefined region is full;
   overwriting one or more records saved in the predefined region automatically with the recording of the conversation content of the ongoing call according to the chronological order of the saving time of the one or more records saved in the predefined region, when the predefined region is full.

8. The method according to claim 1, wherein the record tracing instruction is provided by the user during the ongoing call.

9. The method according to claim 1, wherein the record tracing instruction is provided by the user after the ongoing call.

10. The mobile terminal according to claim 4, wherein the record tracing instruction is provided by the user during the ongoing call.

11. The mobile terminal according to claim 4, wherein the record tracing instruction is provided by the user after the ongoing call.

* * * * *